United States Patent [19]
Konishi et al.

[11] Patent Number: 6,091,899
[45] Date of Patent: *Jul. 18, 2000

[54] APPARATUS FOR DETECTING THE DIRECTION OF VISUAL AXIS AND INFORMATION SELECTING APPARATUS UTILIZING THE SAME

[75] Inventors: Kazuki Konishi, Hino; Akihiko Nagano, Kawasaki; Tokuichi Tsunekawa, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/448,871

[22] Filed: May 24, 1995

Related U.S. Application Data

[63] Continuation of application No. 08/084,330, Jun. 30, 1993, abandoned, which is a continuation of application No. 07/406,588, Sep. 13, 1989, abandoned.

[30] Foreign Application Priority Data

Sep. 16, 1988 [JP] Japan .................................. 63-231934
Sep. 26, 1988 [JP] Japan .................................. 63-242039
Aug. 31, 1989 [JP] Japan .................................. 1-225350

[51] Int. Cl.$^7$ .................................................. G03B 17/00
[52] U.S. Cl. .............................................................. 396/51
[58] Field of Search ..................................... 354/400, 404, 354/219, 62, 195.1, 289.1; 351/210; 396/51

[56] References Cited

U.S. PATENT DOCUMENTS

| | | | |
|---|---|---|---|
| 3,542,457 | 11/1970 | Balding et al. | 351/7 |
| 3,699,248 | 10/1972 | McKechnie | 178/6.8 |
| 3,864,030 | 2/1975 | Cornsweet . | |
| 3,923,370 | 12/1975 | Mostrom | 350/55 |
| 3,936,849 | 2/1976 | Tsujimoto | 354/195 |
| 4,019,813 | 4/1977 | Cornsweet et al. | 351/14 |
| 4,034,401 | 7/1977 | Mann | 358/93 |
| 4,109,145 | 8/1978 | Graf | 250/201 |
| 4,574,314 | 3/1986 | Weinblatt | 328/227 |
| 4,595,990 | 6/1986 | Garwin | 364/518 |
| 4,648,052 | 3/1987 | Friedman et al. | 351/210 |
| 4,748,502 | 5/1988 | Friedman et al. | 351/210 |
| 4,836,670 | 6/1989 | Hutchinson | 351/210 |
| 4,848,340 | 7/1989 | Bille et al. | 128/303.1 |

(List continued on next page.)

FOREIGN PATENT DOCUMENTS

| | | |
|---|---|---|
| 53-23038 | 7/1978 | Japan . |
| 61-172552 | 8/1986 | Japan . |
| 61-265523 | 11/1986 | Japan . |
| 62-19149 | 1/1987 | Japan . |
| 62-63805 | 3/1987 | Japan . |
| 61-171264 | 10/1987 | Japan . |
| 63-94232 | 4/1988 | Japan . |

OTHER PUBLICATIONS

Cornsweet, et al., "Accurate two-dimensional eye tracker using first and fourth Purkinje images", Journal of the Optical Society of America, vol. 63, No. 8 (Aug. 1973).

*Primary Examiner*—Russell E. Adams
*Attorney, Agent, or Firm*—Fitzpatrick, Cella, Harper & Scinto

[57] ABSTRACT

A camera operating in a plurality of photographing modes is provided with an image receiver for receiving the optical image of an object, a viewfinder for observing the object therethrough, a display device for displaying the photographing modes in visually recognizable characters so that they can be seen through the viewfinder, detecting means for detecting the direction of the visual axis of the photographer gazing at desired one of the characters, means for causing the photographer to recognize the completion of the selection of the photographing mode, and a controller for setting the camera to the selected photographing mode in conformity with the result of the detection by the detecting means, and controlling the camera in the selected photographing mode.

55 Claims, 11 Drawing Sheets

U.S. PATENT DOCUMENTS

| | | | |
|---|---|---|---|
| 4,856,869 | 8/1989 | Sakata et al. | 350/162.18 |
| 5,036,347 | 7/1991 | Tsunekawa et al. | 354/62 X |
| 5,214,466 | 5/1993 | Nagano et al. | 354/62 X |
| 5,239,337 | 8/1993 | Takagi et al. | 354/219 |
| 5,245,371 | 9/1993 | Nagano et al. | 354/62 X |
| 5,245,381 | 9/1993 | Takagi et al. | 354/219 |
| 5,327,191 | 7/1994 | Shindo et al. | 354/402 |
| 5,486,892 | 1/1996 | Suzuki et al. | . |

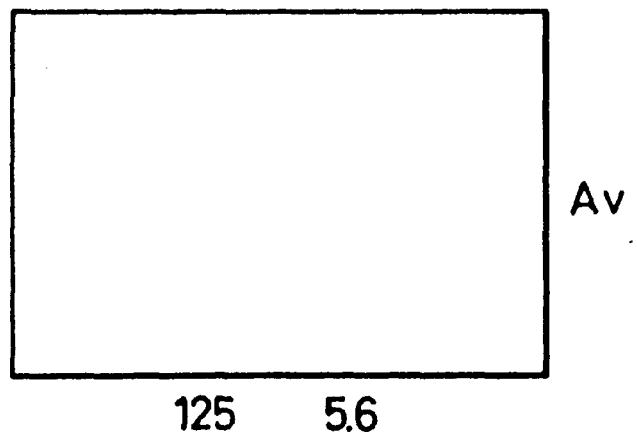
FIG.12(A)   Tv                               Av
                125    5.6
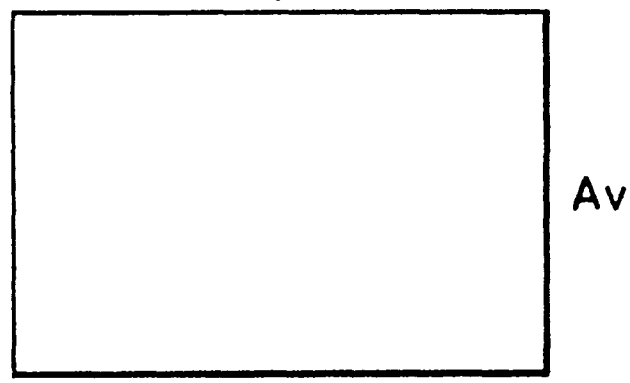
FIG.12(B)   Tv                               Av
                125    5.6
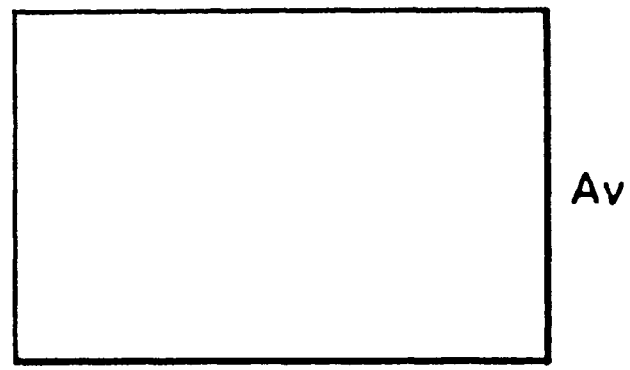
FIG.12(C)   Tv                               Av
                250    4.0

FIG.13(A) ExpComp
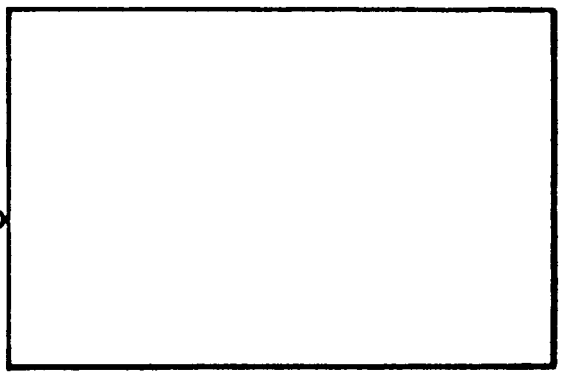
125  5.6
FIG.13(B) ExpComp
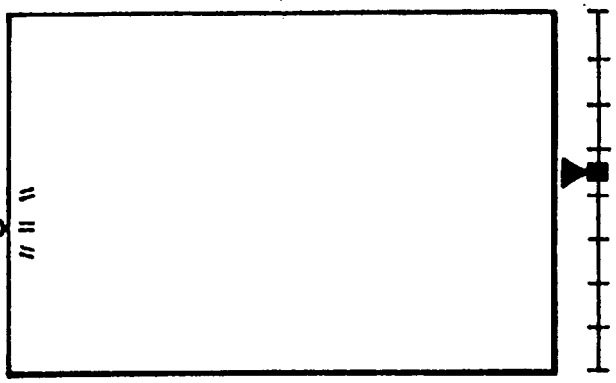
125  5.6
FIG.13(C) ExpComp
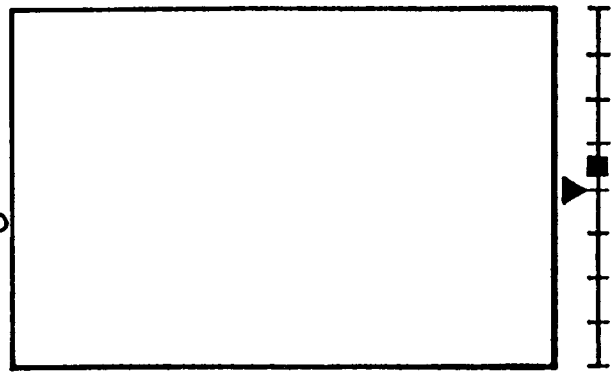
90  5.6

APPARATUS FOR DETECTING THE DIRECTION OF VISUAL AXIS AND INFORMATION SELECTING APPARATUS UTILIZING THE SAME

This application is a continuation of prior application Ser. No. 08/084,330 filed on Jun. 30, 1993, which is a continuation of application Ser. No. 07/406,588 filed on Sep. 13, 1989, both now abandoned.

BACKGROUND OF THE INVENTION

1. Field of the Invention

This invention relates to an apparatus provided with an observation unit and using the operations of various functions and designed so as to be capable of selecting and setting functions by the direction of the operator's visual axis, and is particularly effective for a still camera or a video camera. Also, an apparatus for detecting the direction of visual axis according to the present invention is designed such that even if the position of the operator's eyes is wrong in the spacing and/or aligning from a predetermined position, it is compensated for and a result of detection of the direction of visual axis which is practically usable is obtained.

2. Related Background Art

Apparatuses for detecting the direction of the visual axis of an eye to be examined are known.

For example, the method described in *Journal of Optical Society of America*, Vol. 63, No. 8, pp. 921 and so on or the method disclosed in Japanese Laid-Open Patent Application No. 61-172552 projects light rays onto the front eye part of an eye to be examined and utilizes the Purkinje image which is the reflected image by the cornea or the crystalline lens.

A television camera which receives the reflected light by the cornea of the operator and detects eye movement and utilizes the result in auto focusing is disclosed in U.S. Pat. No. 4,574,314.

Apart from this, a construction as shown in FIG. 15 of the accompanying drawings has been proposed as an eye axis detecting method using the outline of iris. This method utilizes the fact that the iris is lower in reflectance than the sclera and detection of the boundary between the two is relatively easy, and both horizontal sides of the periphery of the iris (the boundary portion between the iris and the sclera) are first illuminated in the form of a spot or in the form of a strip by a light source LS. The reflected light therefrom is received by two light receiving elements PD, and the amount of movement of the eyeball in the horizontal direction (the angle of rotation) is detected from the differential signal thereof. Also, the amount of movement of the eyeball in the vertical direction is detected from the sum signal of the two light receiving elements PD. An infrared light emitting diode is used as the light source LS and infrared photodiodes are used as the light receiving elements PD, whereby a feeling of physical disorder to human eyes is eliminated.

However, this apparatus is based on the premise that it is used with the optic axis of the detection device being brought into coincidence with the optic axis of the eye to be examined and therefore, it is unsuitable for a case where as in an observing eye which is inadvertently looking into the eyepiece of an optical instrument such as a single-lens reflex camera, there is a great possibility that eccentricity is included between the optic axis of the eyepiece and the eyeball axis.

Incidentally, the necessity of detecting the direction of the visual axis of the eye to be examined which is looking into a single-lens reflex camera is based on the fact that the advance of the automatic focus detecting technique in cameras has led to the provision of distance measuring fields for detecting the focus not only at the center of the picture plane but also at a plurality of locations, which in turn has led to the necessity of providing input means for quickly selecting one of them, or the fact that there is a desire to simplify means for changing over the other conditions of the camera, for example, the average photometry and the priority photometry or selecting and inputting one of a plurality of photographing modes. Such necessity exists not only in cameras, but also in observation apparatuses such as microscopes or position detecting apparatuses or the like.

Where an observer looks into an eyepiece, there is more or less difference in the distance of distinct vision from person to person or there arises an individual difference in the spacing between the eyepiece and the observing eye due to habit or wearing of spectacles.

However, if the spacing between the detection apparatus and the observing eye is not constant when information is to be obtained about the observing eye, the reliability of the detected information will unavoidably be remarkably low, and this is inconvenient for a use which requires accurate measurement.

A related art is described in U.S. patent application Ser. No. 327,784 by the assignee of the present invention. Other related arts include U.S. Pat. Nos. 3,542,457, 3,699,248, 3,923,370, 4,019,813 and 4,034,401. On the other hand, the operation of selecting the photographing modes of still cameras recently used will hereinafter be briefly described with reference to FIG. 16 of the accompanying drawings. In the figure, the reference numeral 31 designates a dial for information selection, the reference numeral 32 denotes an exposure control mode selecting switch, the reference numeral 33 designates an exposure correction button, the reference numeral 34 denotes a film wind-up mode selecting button, and the reference numeral 35 designates a focus mode selecting button. With the depression of one of the buttons 32 to 35, the dial 31 may be rotated so as to select desired one of various modes.

In the case of such selecting operation, there has been the cumbersomeness that the photographer must look aside the viewfinder each time he changes the mode.

SUMMARY OF THE INVENTION

It is an object of the present invention to enable the selection of a plurality of operation modes in an apparatus having a plurality of operation modes, such as a camera, to be executed without looking aside an observation unit.

It is another object of the present invention to make the setting of more concrete conditions about a selected operation mode possible.

It is still another object of the present invention to make accurate detection of the direction of visual axis possible even if the position of the observer's eye deviates from a predetermined position.

BRIEF DESCRIPTION OF THE DRAWINGS

FIGS. 12(A), (B) and (C) show an input process.

FIGS. 13(A), (B) and (C) show another input process.

DESCRIPTION OF THE PREFERRED EMBODIMENTS

Figure 1:
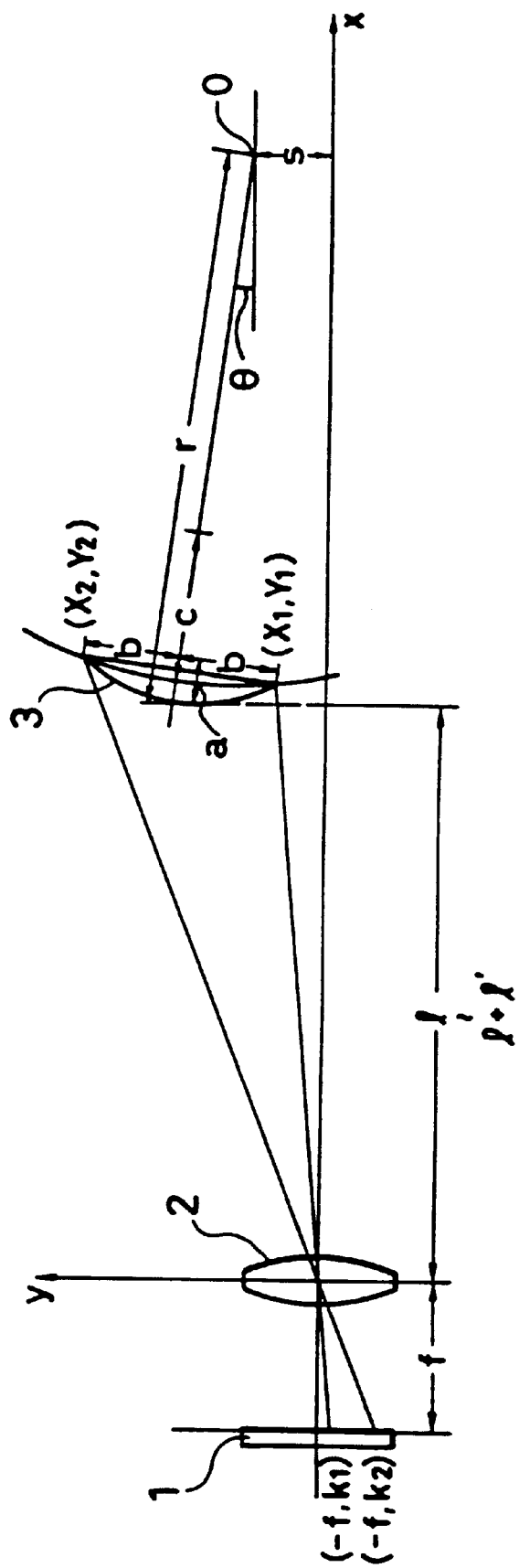
FIG. 1 is an optical cross-sectional view for illustrating a method of detecting the visual axis in accordance with an embodiment of the present invention.

The basic construction for the detection of the direction of visual axis will hereinafter be described with reference to FIG. 1. Although FIG. 1 is depicted as a horizontal cross-section, it is similar also in a vertical direction.

The reference numeral 1 designates a line type image sensor, the reference numeral 2 denotes an imaging lens, and the reference numeral 3 designates an eye to be examined. The image sensor 1 is disposed at a distance f from the imaging lens 2. l represents the distance from a position optically conjugate with the image sensor 1 to the imaging lens 2, and if the vertex of the cornea of the eye to be examined lies at the conjugate position, accurate detection will be executed.

Here, however, it is supposed that a difference l' is included in the predetermined distance l. The x coordinates are plotted on the optic axis of the imaging lens 2, and the y coordinates are plotted on a line passing through the principal point of the imaging lens 2 and perpendicular to the x-axis. O indicates the center of rotation of the eyeball of the eye 3 to be examined, and r indicates the length between the center of rotation and the vertex of the cornea. In the state shown, the eye to be examined is parallel-eccentric relative to the optic axis of the imaging lens 2, and S indicates the amount of displacement thereof. As regards the numerical data of the eye to be examined, b is the radius of the iris, c is the radius of curvature of the front surface of the cornea, a is a constant represented by $a = c - \sqrt{c^2 - b^2}$ (in the light of the practical accuracy). When a person gazes steadily, the person sees a thing by a yellow spot somewhat eccentric from the axis of the eyeball and therefore, there occurs some deviation between the visual axis and the eyeaxis, but it can be offset in a calculation. This point is described in the applicant's previous application Ser. No. 327,784. Herein, for the sake of convenience, description is proceeded on the assumption that the two are coincident with each other.

If as shown, the coordinates of the two points of intersection between the outline of the iris and a horizontal line passing through the center of the iris when the angle of rotation is θ and the amount of displacement is S are $(X_1, Y_1)$ and $(X_2, Y_2)$ and the imaging positions on the sensor are $(-f, K_1)$ and $(-f, K_2)$, $$\begin{cases} -f : X_1 = K_1 : Y_1 \\ -f : X_2 = K_2 : Y_2 \end{cases} \quad (1)$$

and therefore, $K_1$ and $K_2$ are as follows:

$$\begin{cases} K_1 = \dfrac{-f \cdot Y_1}{X_1} = \dfrac{-f\{(r-a)\sin\theta - b\cos\theta + S\}}{l + r - (r-a)\cos\theta - b\sin\theta} \\ K_2 = \dfrac{-f \cdot Y_2}{X_2} = \dfrac{-f\{(r-a)\sin\theta - b\cos\theta + S\}}{l + r - (r-a)\cos\theta + b\sin\theta} \end{cases} \quad (2)$$

The solutions thereof are found as follows:

$$\begin{cases} \theta = \sin^{-1}(K_1 + K_2)\dfrac{(l+r)}{\sqrt{u^2 + V^2}} - \tan^{-1}\dfrac{V}{u} \\ S = \dfrac{-K_1}{f}\{l + r - (r-a)\cos\theta - b\sin\theta\} - \\ \quad\quad \{(r-a)\sin\theta - b\cos\theta\} \end{cases} \quad (3)$$

where $\begin{cases} u = -(K_1 + K_2)b \\ V = (r-a)(K_1 + K_2) - 2fb \end{cases}$ Consequently, if the coordinates of the left end and right end of the outline of the iris are found by the image sensor, the amount of rotation and the amount of displacement of the eyeball, i.e., the direction of the visual axis, can be found accurately.

On the other hand, assuming that of these amounts, l changes to (l+l'), the equation (2) is modified as follows:

$$\begin{cases} K_1 = \dfrac{-f\{(r-a)\sin\theta - b\cos\theta + S\}}{l + l' + r - (r-a)\cos\theta - b\sin\theta} \\ K_2 = \dfrac{-f\{(r-a)\sin\theta + b\cos\theta + S\}}{l + l' + r - (r-a)\cos\theta + b\sin\theta} \end{cases} \quad (2')$$

If the difference between the two equations in the equation (2') is taken and suitable approximation is done to thereby rearrange the equation (2'), $$K_1 - K_2 \cong \dfrac{(-2bf)\{(r-a) - (l + l' + r)\cos\theta\}}{\{l + l' + r - (r-a)\cos\theta\}^2} \quad (4)$$

Hence, $$l + l' + r = (r-a)\cos\theta + \dfrac{2bf\cos\theta}{K_1 - K_2} - \dfrac{(r-a)\sin^2\theta}{\cos\theta}$$

$$l + l' = (r-a)\cos\theta + \dfrac{2bf\cos\theta}{K_1 - K_2} - r - \dfrac{(r-a)\sin^2\theta}{\cos\theta}$$

Incidentally, if detection is effected with the examinee caused to gaze at the front, θ=0° and therefore l+l' can also be found.

On the other hand, if the equation (4) is substituted for the equation (2') to find the angle of rotation θ and the amount of displacement S, $$\theta = \frac{1}{2}\left\{\cos^{-1}(K_1 + K_2)\right.$$

$$\left.\frac{(r-a)}{\sqrt{(K_1+K_2)^2 b^2 + (K_1-K_2)^2(r-a)^2}} - \phi\right\} \quad (5)$$

$$S = \frac{-K_1}{f}\left\{\frac{2bf\cos\theta}{K_1 - K_2} - b\cos\theta - \frac{(r-a)\sin^2\theta}{\cos\theta}\right\} -$$

$$\{(r-a)\sin\theta - b\cos\theta\}$$

$$\text{where } \phi = \tan^{-1}(K_1 + K_2)\frac{b}{(K_1 - K_2)(r-a)}$$

Here, the values of b and c can be regarded as constants with respect to the practical accuracy.

In this manner, the distance l from the imaging lens to the cornea is corrected by the size $(K_1-K_2)$ of the iris on the image sensor, and by the use of the corrected distance (l+l'), the angle of rotation $\theta$ and the amount of shift S of the visual axis are found. Consequently, the distance from the imaging lens to the cornea is corrected in this manner and therefore, even if this distance varies for some reason or other, the angle of rotation and the amount of displacement of the visual axis, i.e., the direction of the visual axis, can be detected accurately.

Figure 2:
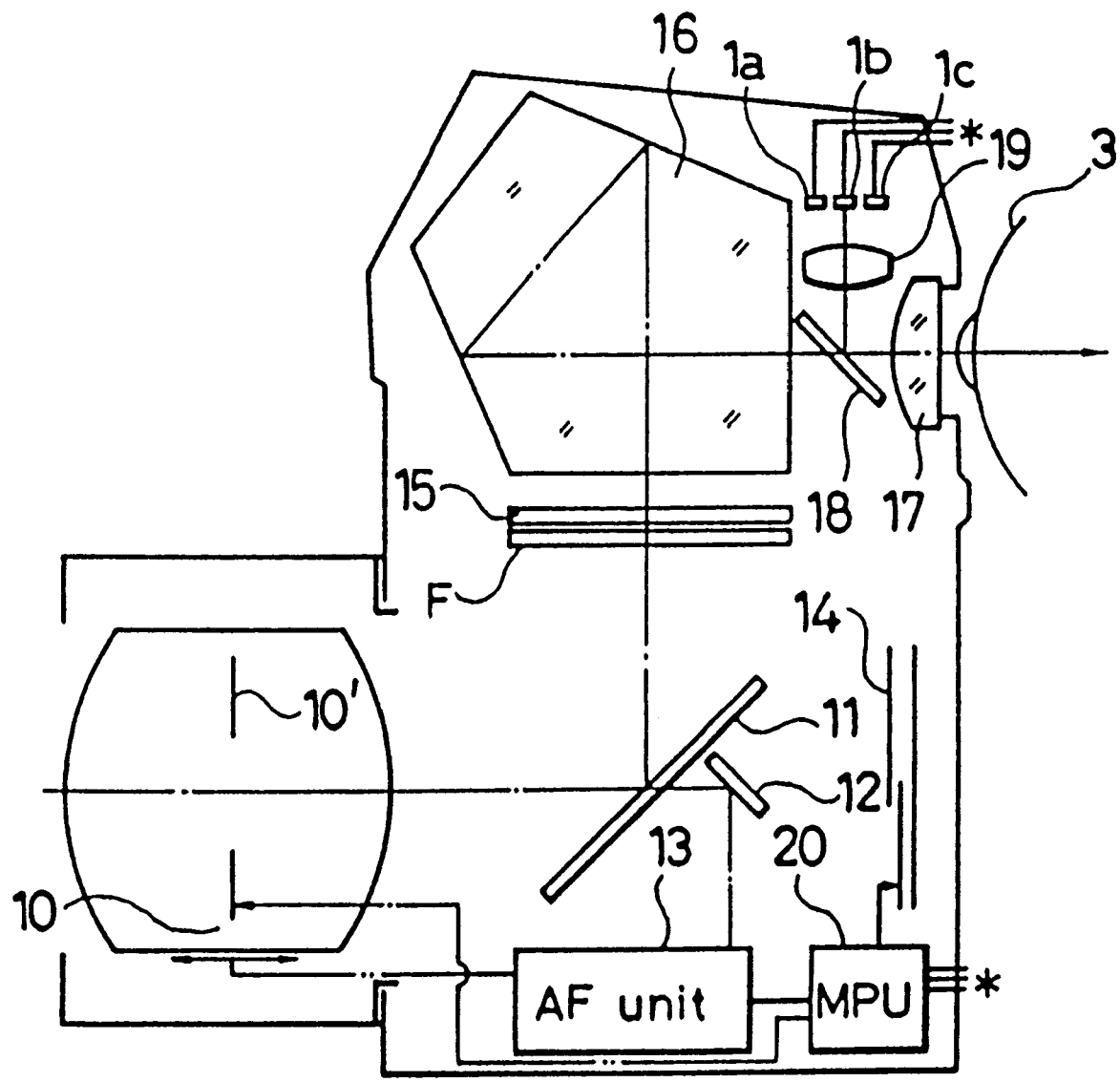
FIG. 2 is a longitudinal cross-sectional view of a single-lens reflex camera.

The arrangement when a visual axis detecting apparatus carrying out the above-described method is incorporated into a camera body is shown in FIG. 2.

Figure 3:
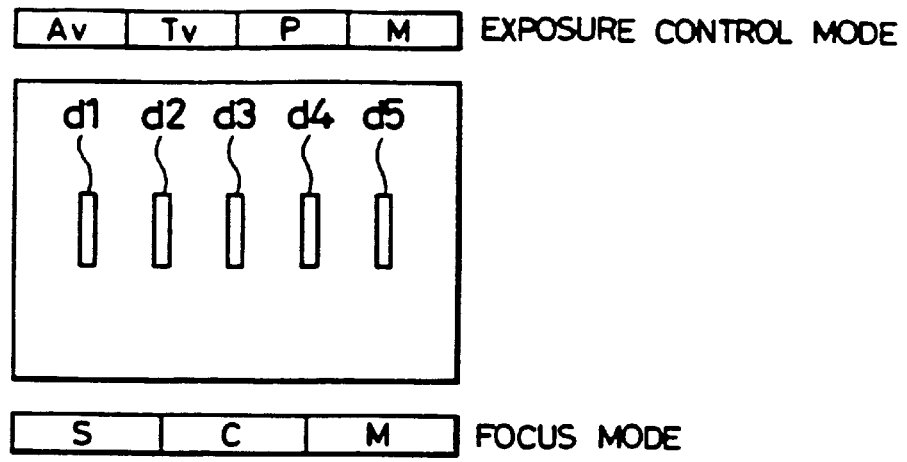
FIG. 3 shows the display within a viewfinder.

In FIG. 2, the reference numeral 10 designates a fixed or removably mounted photo-taking lens which is focus-adjusted by a driver, not shown. The reference numeral 10' denotes an aperture. The reference numeral 11 designates a main mirror which reflects most of the light beam passed through the photo-taking lens 10 and transmits a part of such light beam therethrough. The reference numeral 12 denotes a sub-mirror which reflects the light beam transmitted through the main mirror 11 toward the bottom portion of the camera body. The reference numeral 13 designates a well-known focus detecting unit having a plurality of distance measuring fields. The reference numeral 14 denotes a shutter, the letter F designates a focusing screen used when detection is effected visually, and the reference numeral 15 denotes an information display plate which displays distance measuring field marks d1–d5, for example, in the photographing screen as shown in FIG. 3, and also displays exposure control modes such as $T_V$, $A_V$, P and M and focus mode characters such as S (single), C (continuous) and M (manual). The single mode is a mode fixed in the focused state at first after the operation of the focus detecting device, and the continuous mode is a mode in which when the object to be photographed is changed, refocusing is effected following it. A mode selected with the field of view directed to one of the exposure mode display and the focus mode display in synchronism with the depression of a release button, not shown, can be registered in a memory device or one of the distance measuring fields d1–d5 can be registered in the memory device.

In FIG. 2, the reference numeral 16 designates a pentagonal roof prism and the reference numeral 17 denotes an eyepiece. The reference numeral 18 designates an optical path dividing mirror which may be, for example, a dichroic mirror which transmits the visible light therethrough and reflects the infrared light. The reference numeral 19 denotes an imaging lens. The combination of the imaging lens 19 and the eyepiece 17 corresponds to the imaging lens 2 of FIG. 1.

Designated by 1a, 1b and 1c are line image sensors which are juxtaposed in a direction perpendicular to the plane of the drawing sheet. An illuminating system will be described later.

A case where the display within the viewfinder is as shown in FIG. 3 referred to previously will first be considered. When selecting the distance measuring point and the photometering point, the photographer stares at the central row, and when selecting the exposure control mode, the photographer stares at the upper row, and when selecting the focus mode, the photographer stares at the lower row. Discrimination of which row the photographer is staring at is accomplished by discriminating on which of the sensors 1a–1c the width of the iris is imaged most greatly. That is, if the value of $(K_1-K_2)$ in the sensor 1a is greater than the value of $(K_1-K_2)$ in the other sensors, it is judged that the focus mode corresponding to the sensor 1a has been selected. Likewise, if the value of $(K_1-K_2)$ in the sensor 1b is greatest, it is judged that the distance measuring point and the photometering point have been selected, and if the value of $(K_1-K_2)$ in the sensor 1c is greatest, it is judged that the exposure control mode has been selected. Even for the detection of this longitudinal visual axis, as a matter of course, a change in the relative position of the detecting system and the eyeball occurs in the case of a camera. Consequently, unless the amount of rotation and the amount of displacement are grasped accurately, the accurate direction of the visual axis cannot be found. In this case, however, the spacings between the three rows of display are sufficiently great and therefore, even if the accurate direction of the visual axis is not known, but if the rough direction of the visual axis is known, it will be sufficient in practical use. For that purpose, the widths of the iris, i.e., the values of $(K_1-K_2)$, on the three sensors may be compared with one another and on which sensor the value of $(K_1-K_2)$ is greatest may be known.

When the row the photographer is staring at is known, which row he has selected is then discriminated. This is accomplished by the use of $K_1$ and $K_2$ found when comparing on which sensor the width of the iris is greatest. That is, the angle of rotation $\theta$ and the amount of displacement S are calculated by the use of $K_1$ and $K_2$ on the sensor corresponding to the row at which the photographer is staring and the algorithm for calculating the equation (3) or (5) in conformity with the accuracy to be found, whereby the accurate direction of the visual axis is found. From this direction of the visual axis, what the photographer intends can be known. Of course, the calculation of the equation (3) or (5) is possible if a microprocessor 20 in the camera is used. The microprocessor 20 controls the operations of the aperture 10' and the shutter 14 in conformity with each photographing mode.

In this manner, the direction of the longitudinal visual axis is found roughly and the direction of the lateral visual axis is found accurately, whereby to where in the viewfinder display shown in FIG. 3 where the visual axis of the photographer is directed can be known. By the result of this detection, focusing of the phototaking lens 10 is effected and also, exposure is effected at a shutter speed and an aperture value conforming to the exposure control mode.

Figure 4:
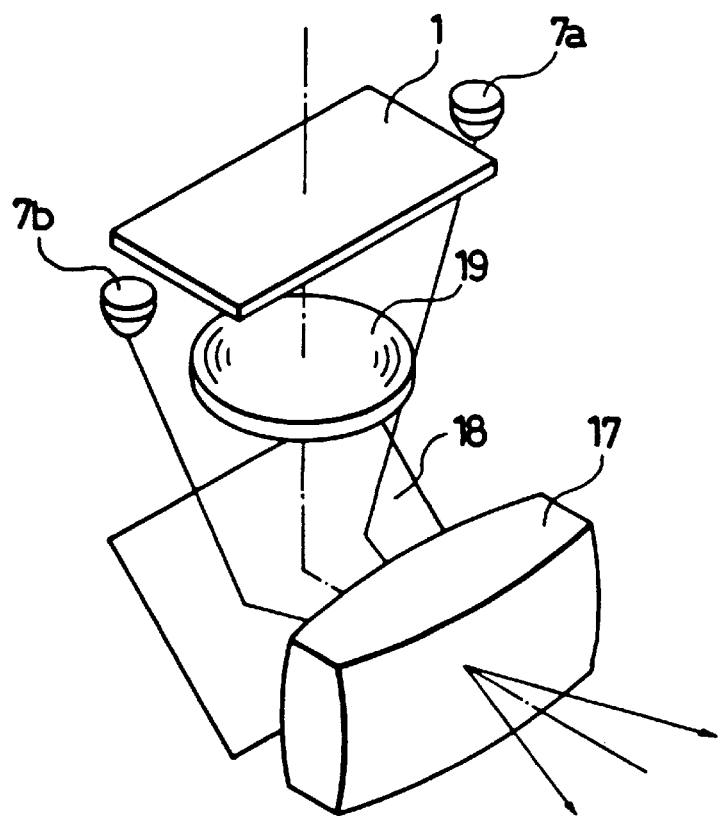
FIG. 4 is a perspective view of an illuminating system.

In order to enhance the contrast of the periphery of the iris and increase the accuracy of detection, actually the light beams from the light sources 7a and 7b are reflected by the optical path divider 18 as shown in FIG. 4, and the periphery of the iris is illuminated through the eyepiece 17. These light sources may desirably be infrared light emitting elements, because projection of a light within man's visibility makes it difficult for the photographer to observe the viewfinder. Also, by using infrared light emitting elements as the light sources and using a dichroic mirror as the optical path divider, the loss of the quantities of light of both the visual axis detecting system and the viewfinder system can be prevented.

Figure 5:
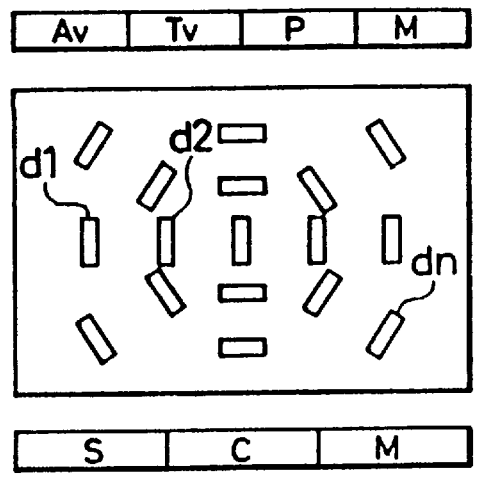
FIG. 5 shows the display within another viewfinder.

Since in the case where the display within the viewfinder is as shown in FIG. 3, the field rows selected by the photographer are longitudinally sufficiently separate from one another, detection of the longitudinal visual axis might be rough, but where a number of distance measuring and photometering points exist as shown in FIG. 5 or where it is supposed to effect distance measurement and photometry at any point in the whole picture plane, the longitudinal visual axis must also be detected accurately. The detection method in such a case will be described below.

Figure 6A:
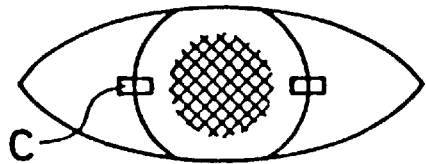
FIG. 6 shows the measured point of an eye to be examined.
Figure 6B:
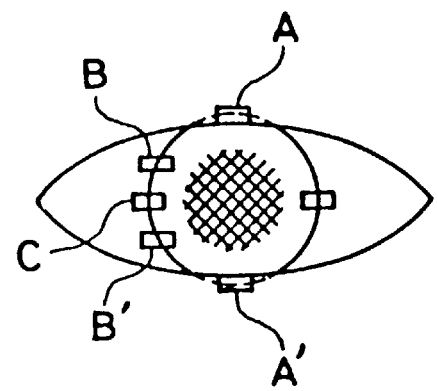
Figure 7:
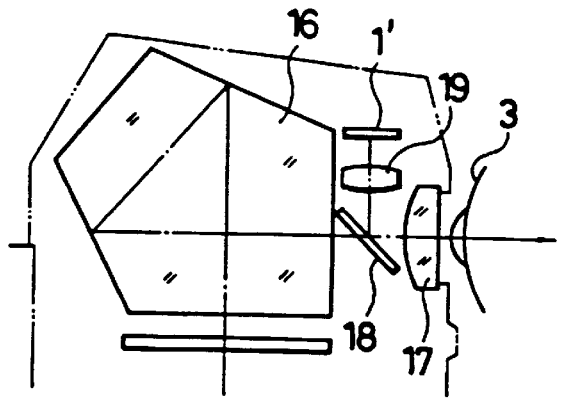
FIG. 7 is a fragmentary cross-sectional view.

To detect the longitudinal visual axis accurately, it is necessary to know two coordinates of the periphery of the iris in the longitudinal direction on the sensor. If the longitudinal visual axis can be detected at a position AA' in FIG. 6, it will be most lo advantageous in respect of accuracy or the like, but this position is usually hidden under the eyelid and cannot be detected. So, let it be assumed that a point BB' is detected. C is the detection point when the lateral visual axis is detected. In this case, the layout is as shown in FIG. 7. The reference numeral 1' designates an area (two-dimensional) sensor.

The output of the area sensor is signal-processed, the lateral line in which the width of the iris becomes greatest is extracted, the coordinates $K_{H1}$ $K_{H2}$ of the periphery of the iris on this line is found, and the angle of rotation $\theta_H$ and the amount of displacement $S_H$ in the lateral direction are found by the use of the equation (5).

A longitudinal line corresponding to BB' is then extracted from the coordinates ($K_{H2}$) of C, the coordinates $K_{V1}$, $K_{V2}$ of the periphery of the iris are found on that line, and the angle of rotation $\theta_V$ and the amount of shift $S_V$ in the longitudinal direction are found by the use of the equation (4).

Figure 8:
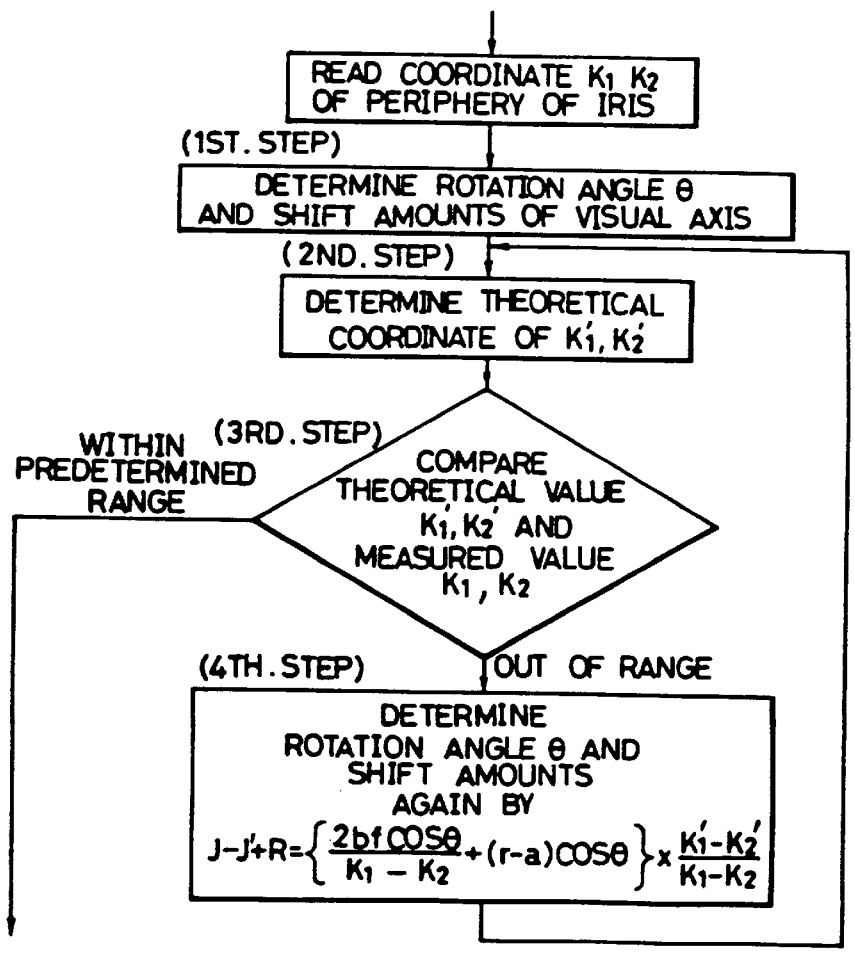
FIG. 8 shows a flow chart of another embodiment.

The algorithm thereof is shown in FIG. 8.

At the first step, the angle of rotation θ and the amount of displacement S are first found by the use of the equation (5). At the second step, the theoretical coordinates $K_1'$, $K_2'$ of the periphery of the iris is calculated by the use of θ and S found at the first step. The calculation formulas used in that case are shown below.

$$\begin{cases} K_1' = \dfrac{-f\{(r-a)\sin\theta - b\cos\theta + S\}}{l + r - (r-a)\cos\theta - b\sin\theta} \\ K_2' = \dfrac{-f\{(r-a)\sin\theta + b\cos\theta + S\}}{l + r - (r-a)\cos\theta + b\sin\theta} \end{cases} \quad (2'')$$

Subsequently, at the third step, the theoretical coordinates $K_1'$, $K_2'$ of the periphery of the iris are compared with the actually measured coordinates $K_1$, $K_2$ of the periphery of the iris. If the difference between $K_1'$ and $K_1$ and the difference between $K_2'$ and $K_2$ are both within a predetermined value, the then angle of rotation θ and the then amount of displacement S are adopted and the algorithm is terminated. If said differences are outside the predetermined value, advance is made to the fourth step. At the fourth step, the distance from the imaging lens to the front surface of the cornea is corrected in the following manner:

$$l + l' + r = \left\{ \dfrac{2bf\cos\theta}{K_1 - K_2} + (r-a)\cos\theta - \dfrac{(r-a)\sin^2\theta}{\cos\theta} \right\} \cdot A$$

$$\text{where } A = \dfrac{K_1' - K_2'}{K_1 - K_2}$$

and by the use of this recorrected distance, the angle of rotation θ and the amount of displacement S are recalculated as shown by $$\theta = \dfrac{1}{2} \left\{ \dfrac{\cos^{-1}(K_1 - K_2)(r-a) - 2(A-1)bf}{\sqrt{(K_1 + K_2)^2 b^2 + \{(2A-1)(K_1 - K_2)(r-a) + 2(A-1)bf\}^2}} - \phi \right\} \quad (6)$$

$$\text{where } \phi = \tan^{-1}(K_1 - K_2) \dfrac{b}{(2A-1)(K_1 - K_2)(\gamma - a) + 2(A-1)fb}$$

$$S = \dfrac{-K_1}{f} \left\{ A \dfrac{2bf\cos\theta}{K_1 - K_2} + (A-1)(r-a)\cos\theta - A \dfrac{(r-a)\sin^2\theta}{\cos\theta} - b\sin\theta \right\} - \{(r-a)\sin\theta - b\cos\theta\}.$$

In this manner, the amounts of displacement and the angles of rotation in the longitudinal direction and the lateral direction, and if by the use thereof, the accurate direction of the visual axis is found, the point where in the viewfinder the photographer is gazing can be known accurately.

In the previous embodiment, the angle of rotation and the amount of displacement of the visual axis are directly found by the use of the equation (5). However, the calculation formula shown in the equation (5) includes a special function called an inverse trigonometric function and therefore, the calculation thereof is cumbersome.

So, in the present embodiment, the angle of rotation and the amount of displacement of the visual axis are found inductively by the use of the equation (5).

Return is then made to the second step, where the theoretical coordinates $K_1'$, $K_2'$ of the periphery of the iris are found, and at the next third step, it is compared with the measured coordinates $K_1$, $K_2$. This operation is continued until the difference between $K_1'$ and K and between $K_2'$ and K is within a predetermined value.

The use of equations (7) and (8) to be described in which the inverse trigonometric function is approximated in this algorithm can also result in obtainment of a similar effect. This is because although the use of the approximation increases the number of repeated calculations until the difference between $K_1'$ and $K_1$ and between $K_2'$ and $K_2$ is within a predetermined value, the use of simple calculation formulas as shown in equations (7) and (8) shortens the time necessary for a calculation.

$$\theta = \frac{-(K_1 + K_2)b}{(K_1 - K_2)(r - a)} \quad (7)$$

$$S = \frac{-K_1}{f}\left\{\frac{2bf\cos\theta}{K_1 - K_2} - b\sin\theta - \frac{(r-a)\sin^2\theta}{\cos\theta}\right\} - \{(r-a)\sin\theta - b\cos\theta\}$$

$$\theta = \frac{-A(K_1 - K_2)(r - a)}{(K_1 + K_2)b} \quad (8)$$

$$S = \frac{-K_1}{f}\left\{A\frac{2bf\cos\theta}{K_1 - K_2} + (A-1)(r-a)\cos\theta - A\frac{(r-a)\sin^2\theta}{\cos\theta} - b\sin\theta\right\} - \{(r-a)\sin\theta - b\cos\theta\}$$

The layout when the detection method based on such a principle is actually used in a camera is as shown in FIGS. 2 and 7. In this case, various operations are performed in the same manner as in the above-described first embodiment.

As described hitherto, in the above-described embodiment, it becomes possible to find the distance from the imaging lens to the eyeball by the utilization of the fact that the size of the image of the iris on the image sensor is in a negative correlation with the distance l from the imaging lens to the eyeball, that is, from the size of the iris on the image sensor, the actual size of the iris and the focal length of the imaging lens. Subsequently, by the use of this found distance, the angle of rotation and the amount of displacement of the visual axis and the direction of the visual axis are found. By finding the direction of the visual axis in this manner, it has become possible to find the accurate direction of the visual axis even if the eyeball is displaced relative to the detection system in any of the horizontal and vertical directions and the direction of the optic axis.

A specific method of inputting these control modes by the visual axis will now be described.

Figure 9:
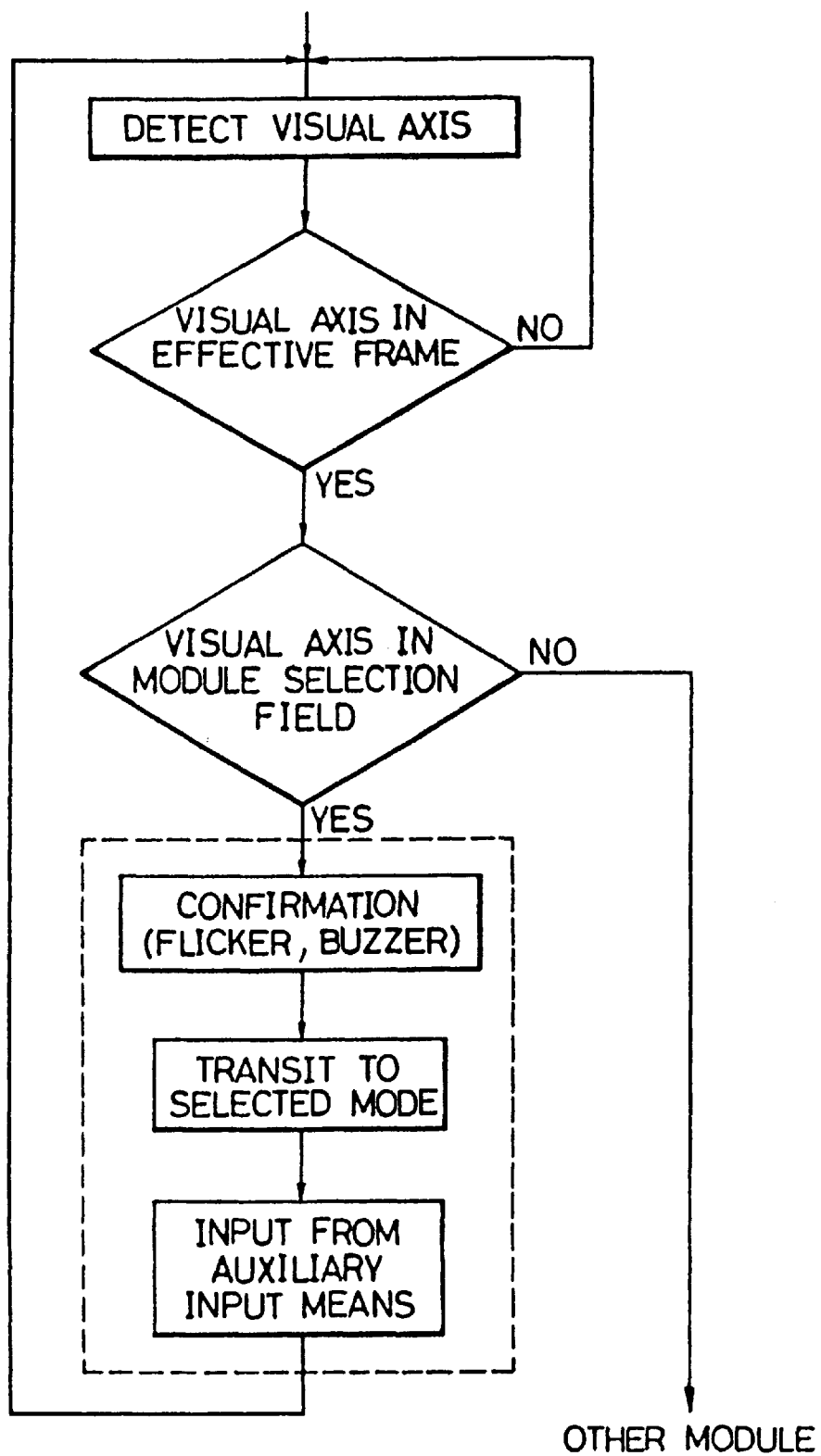
FIG. 9 is a flow chart for explaining the input process.
Figure 10:
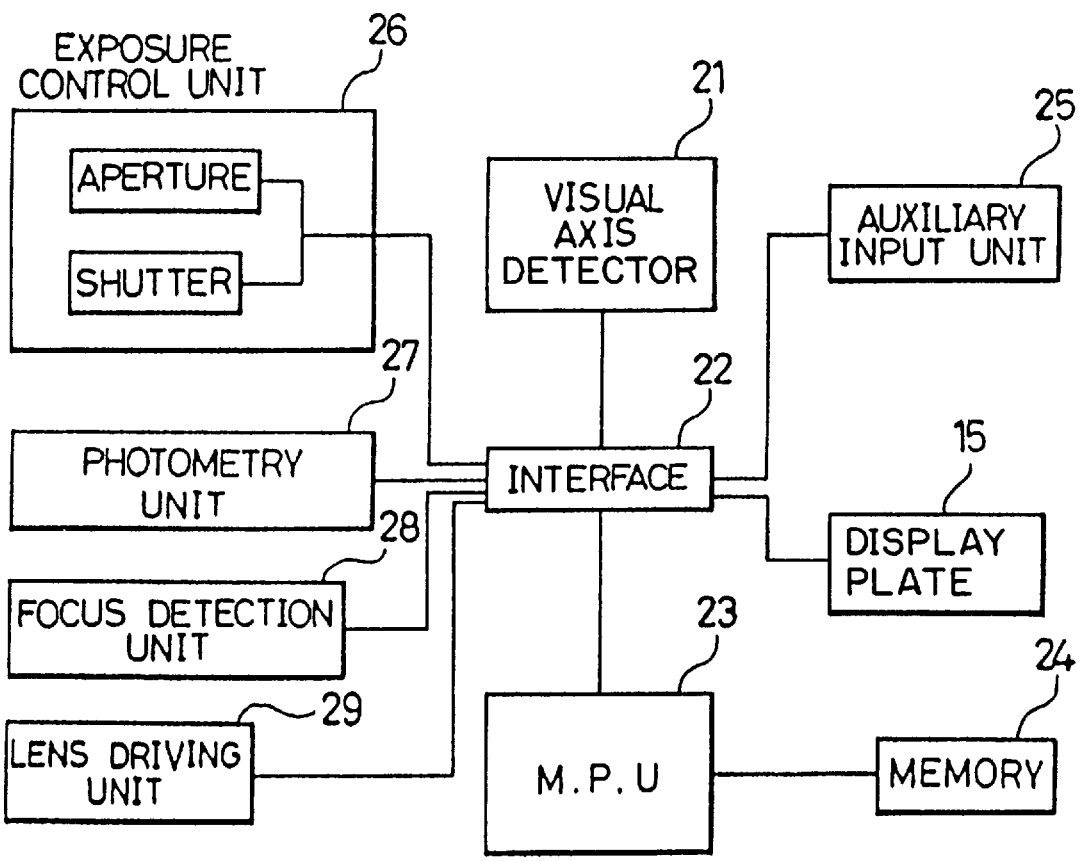
FIG. 10 is a block diagram of constituents.

FIG. 9 is a flow chart showing the operation procedure of the present embodiment, and FIG. 10 is a block diagram of the control system of the camera used in the present embodiment. In FIG. 10, the reference numeral 15 designates a display, the reference numeral 21 designates a visual axis detector, the reference numeral 22 denotes an interface circuit, the reference numeral 23 designates a microprocessing unit (M.P.U.), the reference numeral 24 denotes a memory, the reference numeral 25 designates an auxiliary input unit, the reference numeral 26 denotes an exposure control unit, the reference numeral 27 designates a photometry unit, the reference numeral 28 denotes a focus detection unit capable of detecting the focus-adjusted state of the photo-taking lens with respect to a plurality of positions in the photographing field, and the reference numeral 29 designates a lens driving unit for focusing.

Figure 11:
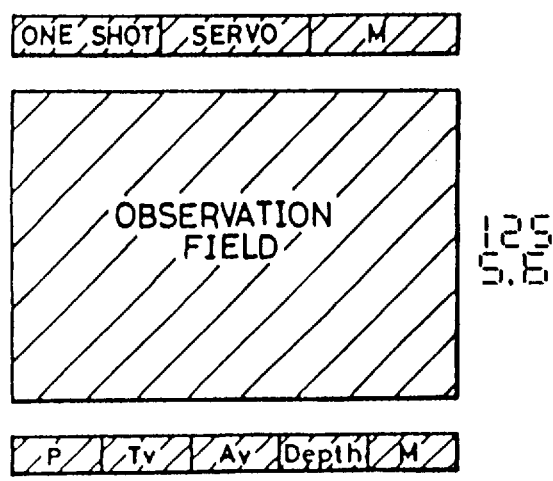
FIG. 11 shows the field of view of a viewfinder.

When the operation sequence of the camera is started as by closing the main switch of the camera, the visual axis detector starts to detect the photographer's visual axis. The detector will be described later. This visual axis detecting operation is performed until it is judged that the photographer's visual axis exists in the effective area within the viewfinder. Here, the effective area is a combination of the field of view within the viewfinder and an area within the viewfinder in which various characters used for inputting are displayed, and is for example the area indicated by hatching in FIG. 11. When the photographer's visual axis exists in the effective area, whether it is in the module selection field or in the viewfinder field is judged, and if it is in the module selection field, advance is made to a control mode selection module, and if it is in the viewfinder field, advance is made to other module (e.g. a module for effecting the inputting of the distance measuring point and the photometering point).

In the control mode selection module, the position in the module selection field to which the visual axis is directed is already known and therefore, the module selection field to which the visual axis is directed is caused to flicker or a buzzer sound is produced, whereby there is performed a confirming operation indicative of the fact that the inputting of the selection of various control modes has been effected by the visual axis. This is for reliably accomplishing the inputting of the photographer's will, and prevents the inconvenience that selection cannot be effected because the visual axis is insufficiently directed when the photographer effects the inputting of mode selection. That is, the photographer can reliably input the operation he desires by directing his visual axis to the mode selection field until the confirming operation is performed. A shift is then made to a control mode selected by the inputting of the visual axis, and the inputting of simple information such as a numerical value in this mode by auxiliary input means such as an electronic dial becomes possible. When the inputting by this auxiliary input means is completed, return is made to the module for detecting the photographer's visual axis.

A description will now be made of specific examples.

A description will first be made of the case of the display within the viewfinder as shown in FIG. 12.

When the photographer gazes at one of characters $T_V$ and $A_V$ within the viewfinder for selection input, the operation of the camera shifts to the control mode selection module of FIG. 1. For example, when the photographer's visual axis is directed to the character $T_V$, the operation of the camera shifts to the control mode selection module, whereafter the character $T_V$ flickers or a buzzer sound is produced and the operation of confirming that the shutter speed ($T_V$) priority AE mode has been selected as the exposure control mode is performed, and the exposure control mode is set to the shutter speed priority AE mode. The inputting of the shutter speed by the auxiliary input means then becomes possible after the termination of the confirming operation, and it becomes possible for the photographer to set a desired shutter speed. The thus set numerical value is displayed in the viewfinder field and the photographer can confirm the situation of a variation in the numerical value. This is effective when the exposure control mode is a program mode or when a desired shutter speed is not obtained even if the aperture value is varied in the $A_V$ (aperture) priority AE mode. The selected mode is effective until other exposure control mode is selected by the operation of the visual axis or the auxiliary input means. Of course, also when the photographer's visual axis is directed to the character $A_V$, a similar operation is performed with respect to the aperture value and a similar effect is obtained.

A description will now be made of the case of the display within the viewfinder shown in FIG. 13.

This is such that exposure correction is effected by the visual axis input, and has the merit that because the photographer can correct exposure without looking aside the viewfinder, he can accomplish composition as he images.

When the photographer directs his visual axis to the index mark EXP. COMP. within the viewfinder and this is set in the control system of the camera, shift is made to the control mode selection module and in the meantime, the confirming operation in which the characters EXP. COMP. flicker or a buzzer, not shown, sounds is performed, whereafter exposure correction becomes possible and a graph for setting an exposure correction value appears on a display panel. The photographer operates the auxiliary input means to set the exposure correction value while watching this graph. When the setting is terminated, the photographer directs his visual axis to the index mark EXP. COMP. once again, and when the camera confirms this, the confirming operation is performed again and at the same time, the set exposure correction value is locked. Thus, when the photographer is to release the exposure correction or change the set value, the above-described operation is repeated once again. Also, whenever the correction value is set, the graph for setting the exposure correction value is displayed so that the photographer can confirm the set value. When the exposure correction is released, this display disappears.

Figure 14A:
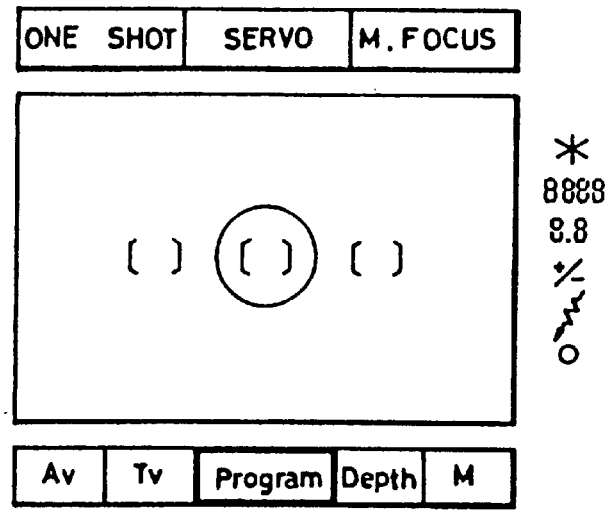
FIGS. 14(A), (B) and (C) show still another input process.
Figure 14B:
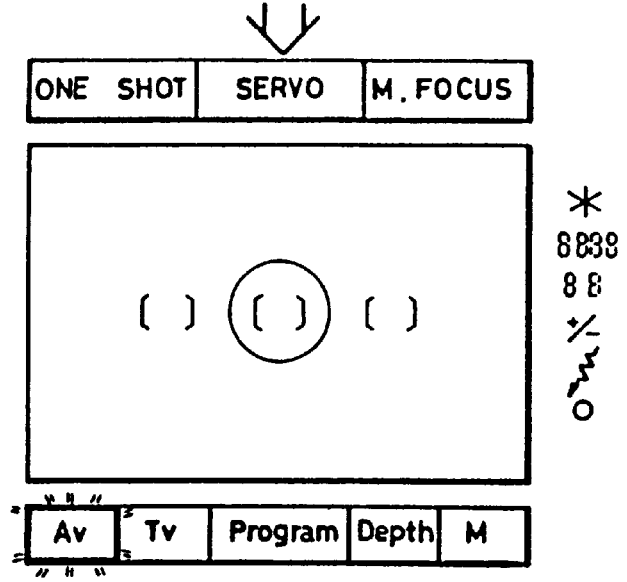
Figure 14C:
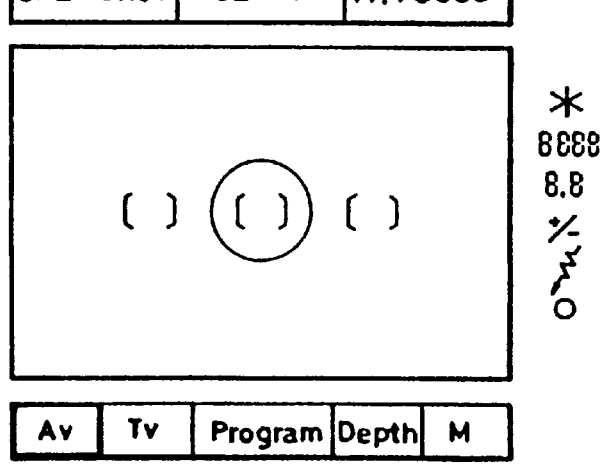
Figure 15A:
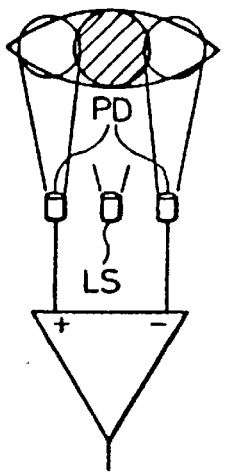
FIGS. 15(A) and (B) illustrate an example of the prior art.
Figure 15B:
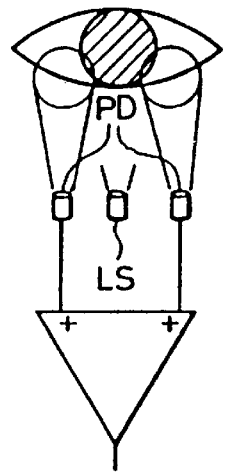
Figure 16A:
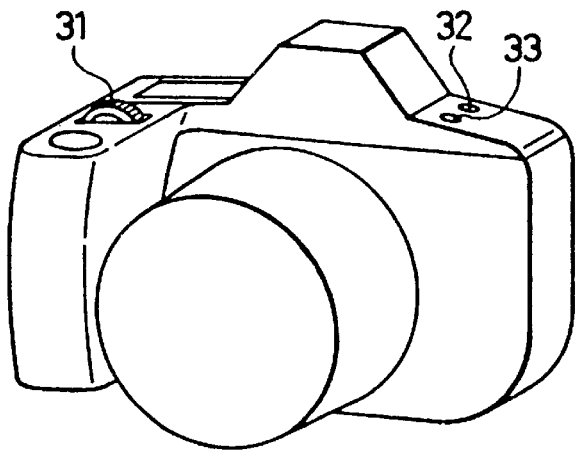
FIGS. 16(A) and (B) are perspective views for illustrating a manual input.
Figure 16B:
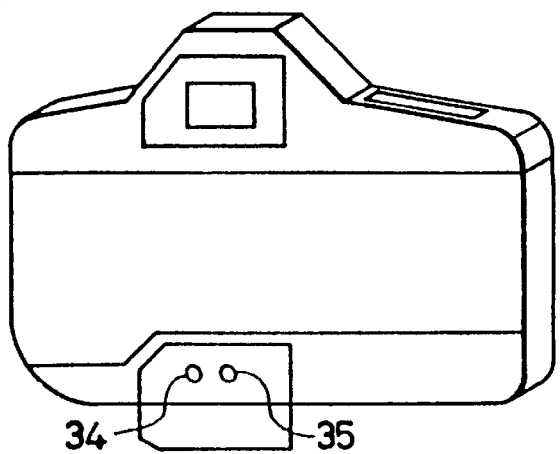

Description will further be made of the case of the display within the viewfinder as shown in FIG. 14.

Above the viewfinder field, there is an index mark for the selection of the auto focus (AF) mode, and below the viewfinder field, there is an index mark for the selection of the automatic exposure control (AE) mode, and on the right of the viewfinder field, there is a liquid crystal panel for displaying the shutter speed and the aperture value.

When the photographer is to select the AF mode, he looks at the index mark above the viewfinder field. When the camera confirms this, a shift is made to the control mode selection module of FIG. 1, in which the latest one (in FIG. 14, SERVO) of the modes so far selected in the module selection field of the AF mode flickers to inform the photographer that the selection of the AF mode has become possible. When in the meantime, the auxiliary input means is operated, the flicker changes to continuous turn-on and at the same time, the portion being turned on goes round. That is, in FIG. 14, it is to be understood that the portion being turned on changes thus: SERVO→M (manual)→ONE SHOT→SERVO. The photographer stops operating the auxiliary input means when the portion being turned on has become coincident with a desired AF mode. When a predetermined time elapses after the termination of the operation, the selection of the AF mode is regarded as having been terminated, and the mode turned on at that time is set. Consequently, when a change of the selection to other AF mode is desired, the above-described operation is repeated again. Also, the display (turn-on) of the set AF mode may be accomplished as by half-depression of the release button, whereby the photographer can always confirm which AF mode is set.

Although not shown, this also holds true of a case where the photographer is to select the AE modes. The photographer looks at one of the AE modes indicated by the AE mode selection index mark. When the camera confirms this, a shift is made to the control mode selection module and the portion corresponding to the AE mode selected by the visual axis flickers, and thereafter is turned on. Simultaneously therewith, a shutter speed and an aperture value conforming to the then brightness are displayed on the right of the viewfinder field, and a selected AE mode is set. For example, when the program AE mode has been set before, if the photographer gazes at $A_V$ (aperture priority AE mode) of the index marks, the camera confirms it and the character $A_V$ flickers and thereafter is turned on. At the same time, the AE mode is set to the aperture priority AE mode, and an aperture value indicated at that time and a shutter speed calculated from that aperture value, luminance information, etc. are displayed on the right of the viewfinder field. Now, when the selected AE mode is set, setting of any shutter speed or any aperture value by the operation of the auxiliary input means becomes possible. Of course, this holds true when the shutter speed priority AE mode, the aperture priority AE mode, the manual mode or the like is selected, and when the program AE mode or the depth mode in which far and near objects are kept in the depth of field is selected, it is impossible to set any shutter speed or any aperture value even if the auxiliary input means is operated. The operation takes place as described above and therefore, when an AE mode once set is to be changed to other mode, the photographer may again gaze at a desired mode of the index marks indicated below the viewfinder field. Thereafter, the photographer may repeat the operation hitherto described. Also, the set AE mode and the then shutter speed and aperture value are displayed as by half-depression of the release button. Thus, the photographer can always know the set AE mode and the then shutter speed and aperture value.

As described above, in the present embodiment, the selection of various modes such as the exposure control mode, the exposure correction mode, the auto focus mode, etc. is effected by the use of the photographer's visual axis, that is, by detecting the visual axis of the photographer gazing at the index mark for mode selection displayed within the viewfinder, informing the photographer of the detection, thereafter shifting to each selected mode and making the setting and change of various numerical values by the auxiliary input means possible, whereby the following problems can be solved:

(1) cumbersomeness with which the photographing mode is changed;

(2) missing a shutter chance because of much time required for the change; and (3) resulting in a photograph contrary to one's intention because photographing has been effected without a change of mode. Also, the change-over between auto focusing and manual focusing can be accomplished quickly and therefore, even for an object which is unsuitable for auto focusing, quick manual focusing becomes possible and thus, the usability of the camera becomes very good.

We claim:

1. A camera operable to perform a plurality of different functions, comprising:

viewfinder means for observing an object;

display means for displaying the plurality of different functions in visually recognizable characters within said viewfinder means;

determination means for determining a direction of a visual axis of a user corresponding to one of the characters;

means for operating said camera by a function selected by the user in response to a determination by said determination means; and signaling means for producing a confirmation signal recognizable by the user to confirm selection of a function, wherein said determination means calculates an angle of rotation of an eye of the user and an amount of shift of the eye from an optical axis of said determination means to determine a direction of the visual axis of the user based on such calculations.

2. A camera according to claim 1, further provided with manual input means for manually inputting the operating conditions of said selected function.

3. A camera according to claim 1, further provided with image forming means for optically forming the image of said object, and image receiving means for receiving said image.

4. A camera according to claim 3, further provided with light control means for controlling the light from said object received by said image receiving means, in conformity with said plurality of functions.

5. A camera according to claim 3, further provided with focus detecting means for detecting the focus-adjusted state of said image forming means and wherein one of said functions is to effect the focus adjustment of said image forming means in conformity with the result of the detection by said focus detecting means.

6. A camera according to claim 5, wherein said focus detecting means has a sub-function, subordinate to said one function, of detecting the focus adjusted state of said image forming means for an object entering predetermined one of a plurality of predetermined areas of the observation field.

7. A camera according to claim 1, further provided with:
observation means for enabling an object concerned with said apparatus to be observed simultaneously with the display by said display means;
image forming means for optically forming the image of said object;
image receiving means for receiving said image; and
light control means for controlling the light from said object received by said image receiving means, in conformity with said plurality of functions.

8. A camera according to claim 1, wherein even if the photographer's eye deviates from a predetermined position, said determination means determines the direction of the visual axis in accordance with an algorithm compensating for the deviation.

9. A camera according to claim 8, wherein the deviation from said predetermined position is an alignment error.

10. A camera according to claim 8, wherein the deviation from said predetermined position is a spacing error.

11. A camera according to claim 1, wherein said selected function is an exposure control.

12. An camera according to claim 1 further comprising means for renewing the selected function.

13. A camera according to claim 12, wherein said renewing means starts to operate when the photographer gazes at one of said characters.

14. A camera operable in a plurality of photographing modes, comprising:
an image receiver for receiving an optical image of an object;
a viewfinder for observing the object therethrough;
a display device for displaying the plurality of photographing modes in visually recognizable characters observable through said viewfinder;
determination means for determining a visual axis of a photographer in a general direction and then determining the visual axis of the photographer in a precise direction, successively, wherein one of the plurality of photographic modes is selected when the direction of the visual axis determined by said determination means corresponds to the character representing said one of the plurality of photographic modes;
signaling means for producing a confirmation signal recognizable by the photographer to confirm selection of one of the plurality of photographing modes; and
a controller that sets said camera to a selected photographing mode in response to a determination by said determination means, and controls said camera in the selected photographing mode,
wherein said determination means calculates an angle of rotation of a eye of the photographer and an amount of shift of the eye from an optical axis of said determination means to determine a direction of the visual axis of the photographer based on such calculations.

15. A camera according to claim 14, further provided with a manual input device for manually inputting the operating conditions of said selected photographing mode.

16. A camera according to claim 14, further provided with a focus detecting device for detecting the focus-adjusted state of a photo-taking lens, said focus detecting device being controlled in the photographing mode selected by said controller.

17. A camera according to claim 16, wherein said focus detecting device is set to a single mode.

18. A camera according to claim 17, wherein said focus detecting device is set to a continuous mode.

19. An apparatus for determining the direction of visual axis, comprising:
an imaging optical system;
sensor means having a plurality of photosensors for receiving light reflected from an eye of an observer through said imaging optical system and generating an output signal including positional information concerning a plurality of mutually different points in an outside outline of an iris of the eye; and
a calculation device that receives the output signal of said sensor means, calculates an amount of angle of rotation of the observer's eye and an amount of shift of the observer's eye from an optical axis of said imaging optical system, by using the positional information concerning said plurality of mutually different points, and forms a signal indicative of the direction of the visual axis on the basis of the amount of rotation and the amount of shift.

20. A camera according to claim 19, further provided with an optical element for coupling said apparatus and the viewfinder of an optical instrument together.

21. A camera according to claim 20, wherein said optical element is a dichroic mirror.

22. An apparatus according to claim 19, wherein said sensor means is provided with a plurality of linear sensor arrays of photosensors.

23. A camera according to claim 19, wherein said sensor means is provided with a multi-line, two-dimensional photosensor array and said calculation device compares outputs from a plurality of lines of said two-dimensional sensor array.

24. A camera according to claim 19, wherein said calculation device calculates a distance between said imaging optical system and said observer's eye using the information concerning the plurality of mutually different points, and calculation of the amount of rotation and the amount of shift is performed using the calculated distance.

25. A camera capable of being controlled in accordance with a direction of visual axis of a user, comprising:
displaying means for displaying a plurality of visually recognizable characters for indicating a plurality of mutually different photographing modes of said camera;
determining means for determining a direction of visual axis of the user selectively viewing one of the plurality of characters displayed in said displaying means;
inputting means for manually inputting a variable relating to each of said plurality of photographing modes; and
photographing means for controlling said camera according to the variable manually input by said inputting means with a photographing mode corresponding to a direction of the visual axis determined by said determining means.

26. A camera according to claim 25, wherein said determining means calculates an angle of rotation of an eye of the user and a position of the eye of the user relative to said determining means and calculates a direction of a visual axis of the user based on the calculated angle of rotation and position of the eye of the user.

27. A camera according to claim 26, wherein said determining means calculates the angle of rotation and the position of the eye of the user based on information relating to a boundary position between an iris and a white portion of the eye of said user.

28. A camera according to claim 25,
wherein said plurality of photographing modes include an aperture priority exposure mode and a shutter priority exposure mode.

29. An optical apparatus operable to perform a plurality of different functions, comprising:
viewfinder means for observing an object;
display means for displaying the plurality of different functions in visually recognizable characters within said viewfinder means;
determination means for determining a direction of a visual axis of a user corresponding to one of the characters;
means for operating said optical apparatus by a function selected by the user in response to a determination by said determination means; and
signaling means for producing a confirmation signal recognizable by the user to confirm selection of a function,
wherein said determination means calculates an angle of rotation of an eye of the user and an amount of shift of the eye from an optical axis of said determination means to determine a direction of the visual axis of the user based on such calculations.

30. An optical apparatus operable in a plurality of photographing modes, comprising:
an image receiver for receiving an optical image of an object;
a viewfinder for observing the object therethrough;
a display device for displaying the plurality of photographing modes in visually recognizable characters observable through said viewfinder;
determination means for determining a visual axis of a photographer in a general direction and then determining the visual axis of the photographer in a precise direction, successively, wherein one of the plurality of photographic modes is selected when the direction of the visual axis determined by said determination means corresponds to the character representing said one of the plurality of photographic modes;
signaling means for producing a confirmation signal to cause the photographer to confirm selection of one of the plurality of photographing modes; and
a controller that sets said camera to a selected photographing mode in response to a determination by said determination means, and controls said camera in the selected photographing mode,
wherein said determination means calculates an angle of rotation of a eye of the photographer and an amount of shift of the eye from an optical axis of said determination means to determine a direction of the visual axis of the photographer based on such calculations.

31. A camera capable of being controlled according to a direction of visual axis of a user, comprising:
display means for displaying a plurality of characters indicating mutually different exposure modes of said camera, said plurality of exposure modes including an aperture priority exposure mode and a shutter priority exposure mode;
detecting means for detecting to which character of said plurality characters said visual axis of said user is directed; and
means for controlling said camera so that a photographic operation is performed by one of said exposure modes according to a detection result of said detecting means.

32. A camera capable of being controlled according to a direction of visual axis of a user, comprising:
display means for displaying a plurality or characters indicating mutually different focus modes of said camera, said plurality of focus modes including a one shot focus mode and a servo focus mode;
detecting means or detecting to which character of said plurality of characters said visual axis of said user is directed; and
means for controlling said camera so that a photographic operation is performed by one of said focus modes according to a detecting result of said detecting means.

33. A camera capable of being controlled according to a direction of visual axis of a user, comprising:
display means for displaying a plurality of characters indicating mutually different exposure modes of said camera, said plurality of exposure modes including an automatic exposure mode and a manual exposure mode;
detecting means for detecting to which character of said plurality of characters said visual axis of said user is directed; and
means for controlling said camera so that a photographic operation is performed by one of said exposure modes according to a detection result of said detecting means.

34. A camera according to claim 33,
wherein said automatic exposure mode includes an aperture priority exposure mode and a shutter priority exposure model.

35. A camera capable of being controlled according to a direction of visual axis of a user, comprising:
display means for displaying a plurality of characters indicating mutually different focus modes of said camera, said plurality of focus modes including an automatic focus mode and a manual focus mode;
detecting means for detecting to which character of said plurality of characters said visual axis of said user is directed; and
means for controlling said camera so that a photographic operation is performed by one of said focus modes according to a detection result of said detecting means.

36. A camera according to claim 35,
wherein said automatic focus mode includes a one shot focus mode and a servo focus mode.

37. An apparatus comprising:
visual axis detecting means for detecting a direction of visual axis;
selecting means for selecting one setting mode from among a plurality of setting modes based on the direction of visual axis detected by said visual axis detecting means;
a manually operable member; and
setting means for performing a setting operation as to the one setting mode selected by said selecting means, in accordance with operation of said manually operable member.

38. An apparatus according to claim 37,
wherein said setting means changes a setting value as to the one setting mode selected by said selecting means.

39. An apparatus according to claim 37, further comprising:
displaying means for displaying a plurality of characters corresponding to the plurality of setting modes,
wherein said selecting means selects a setting mode corresponding to a specific character to which the direction of visual axis is directed.

40. An apparatus comprising:
visual axis detecting means for detecting a direction of visual axis;
first selecting means for selecting a setting mode capable of selecting a plurality of operational modes based on the direction of visual axis detected by said visual axis detecting means;
a manually operable member; and
second selecting means for selecting one operational mode from among the plurality of operational modes selected by said first selecting means in accordance with operation of said manually operable member.

41. An apparatus according to claim 40, further comprising:
displaying means for displaying a plurality of characters corresponding to the plurality of operational modes included in the setting mode,
wherein said first selecting means selects a setting mode to which an operational mode corresponding to a character to which the direction of visual axis is directed belongs.

42. An apparatus comprising:
visual axis detecting means for detecting a direction of visual axis;
a manually operable member for inputting a plurality of kinds of information; and
control means for changing over a kind of information which can be input by said manually operable member in accordance with the direction of visual axis detected by said visual axis detecting means.

43. An apparatus according to claim 42,
wherein said visual axis detecting means comprises a light-receiving sensor for light-receiving an image of an eyeball, and
wherein the visual axis is detected by using information as to an amount of rotation of the eyeball from the image of the eyeball light-received by said light-receiving sensor and information as to an amount of displacement between said light-receiving sensor and the eyeball.

44. An apparatus comprising:
visual axis detecting means for detecting a direction of visual axis;
a manually operable member; and
control means for inputting predetermined information in accordance with operation of said manually operable member when the visual axis detected by said visual axis detecting means lies in a predetermined direction and said manually operable member is operated.

45. An apparatus according to claim 44,
wherein said visual axis detecting means comprises a light-receiving sensor for light-receiving an image of an eyeball, and
wherein the visual axis is detected by using information as to an amount of rotation of the eyeball from the image of the eyeball light-received by said light-receiving sensor and information as to an amount of displacement between said light-receiving sensor and the eyeball.

46. A camera comprising:
a finder including a visual axis detecting apparatus, said visual axis detecting apparatus comprising:
a light source for illuminating an eye;
an image forming optical system for forming an image of the eye on an image sensor;
calculating means for detecting a plurality of positions in a boundary between an iris and a sclera of the image of the eye to obtain an angle of rotation of the eye and an amount of displacement of the eye with respect to said image forming system based on the detected result, thereby obtaining the direction of visual axis of the eye; and
a phototaking optical system for taking a photo of an object.

47. A camera comprising:
an imaging optical system;
a light source that illuminates an eye;
an image forming optical system that forms an image of the eye on an image sensor; and
calculating means for obtaining an angle of rotation of the eye by using an output of said image sensor and a distance from said eye to said image forming optical system;
wherein said calculating means detects positions of characterizing portions in the image on said image sensor to obtain the distance from the eye to said image forming optical system based on the positions of said characterizing points.

48. A camera according to claim 47, wherein said characterizing points correspond to points lying on a boundary between an iris and a sclera of the eye.

49. A camera comprising:
an imaging optical system;
a light source that illuminates an eye;
an image forming optical system that forms an image of the eye on an image sensor; and
calculating means for obtaining an amount of displacement of the eye by using an output of said image sensor and a distance from the eye to said image forming optical system;
wherein said calculating means detects positions of characterizing portions in the image on said image sensor to obtain the distance from the eye to said image forming optical system based on the positions of said characterizing points.

50. A camera according to claim 49, wherein said characterizing points correspond to points lying on a boundary between an iris and a sclera of the eye.

51. A camera comprising:
an imaging optical system;
a light source that illuminates an eye;
an image forming optical system that forms an image of the eye on an image sensor; and
calculating means for obtaining an angle of rotation of said eye and an amount of displacement of the eye by using an output of said image sensor and a distance from the eye to said image forming optical system and for obtaining a direction of visual axis of the eye based on the angle of rotation of the eye and the amount of displacement of the eye;

wherein said calculating means detects positions of characterizing portions in the image on said image sensor to obtain the distance from the eye to said image forming optical system based on the positions of said characterizing points.

52. A camera according to claim 51, wherein said characterizing points correspond to points lying on a boundary between an iris and a sclera of the eye.

53. A camera comprising:

a finder including a detecting apparatus, said detecting apparatus comprising:

a light source that illuminates an eye;

an image forming optical system that forms an image of the eye on an image sensor;

calculating means for obtaining an angle of rotation of the eye by using an output of said image sensor and a distance from said eye to said image forming optical system, wherein said calculating means detects positions of characterizing portions in the image on said image sensor to obtain the distance from the eye to said image forming optical system based on the positions of said characterizing points; and a phototaking optical system for taking a photo of an object.

54. A camera comprising:

a finder including a detecting apparatus, said detecting apparatus comprising:

a light source that illuminates an eye;

an image forming optical system that forms an image of the eye on an image sensor;

calculating means for obtaining an amount of displacement of the eye by using an output of said image sensor and a distance from the eye to said image forming optical system, wherein said calculating means detects positions of characterizing portions in the image on said image sensor to obtain the distance from the eye to said image forming optical system based on the positions of said characterizing points; and a phototaking optical system for taking a photo of an object.

55. A camera comprising:

a finder including a detecting apparatus, said detecting apparatus comprising:

a light source that illuminates an eye;

an image forming optical system that forms an image of the eye on an image sensor;

calculating means for obtaining an angle of rotation of said eye and an amount of displacement of the eye by using an output of said image sensor and a distance from the eye to said image forming optical system and obtaining a direction of visual axis of the eye based on the angle of rotation of the eye and the amount of displacement of the eye, wherein said calculating means detects positions of characterizing portions in the image on said image sensor to obtain the distance from the eye to said image forming optical system based on the positions of said characterizing points; and a phototaking optical system for taking a photo of an image.

* * * * *

UNITED STATES PATENT AND TRADEMARK OFFICE
CERTIFICATE OF CORRECTION

PATENT NO. : 6,091,899
DATED : July 18, 2000
INVENTOR(S) : KAZUKI KONISHI, ET AL.

Page 1 of 2

It is certified that error appears in the above-identified patent and that said Letters Patent is hereby corrected as shown below:

Column 3

Line 56, "eyeaxis," should read --eye axis,--.

Column 6

Line 55, "to where" should read --the point--.

Column 7

Line 22, "lo" should be deleted.

Column 13

Line 35, "claim 1" should read --claim 1,--.
　　Line 66, "a" should read --an--.

Column 14

Line 33, "A camera" should read --An apparatus--.
　　Line 36, "A camera" should read --An apparatus--.
　　Line 40, "A camera" should read --An apparatus--.
　　Line 46, "A camera" should read --An apparatus--.

UNITED STATES PATENT AND TRADEMARK OFFICE
CERTIFICATE OF CORRECTION

PATENT NO. : 6,091,899
DATED : July 18, 2000
INVENTOR(S) : KAZUKI KONISHI, ET AL.

Page 2 of 2

It is certified that error appears in the above-identified patent and that said Letters Patent is hereby corrected as shown below:

Column 15

Line 59, "a" should read --an--.

Column 16

Line 5, "plurality" should read --plurality of--.
Line 17, "or" should read --for--.

Column 19

Line 22, "a phototaking" should read --¶ a phototaking--.

Signed and Sealed this

Seventeenth Day of April, 2001

Attest:

NICHOLAS P. GODICI

*Attesting Officer*   *Acting Director of the United States Patent and Trademark Office*